United States Patent
Holder et al.

(10) Patent No.: US 7,376,226 B2
(45) Date of Patent: *May 20, 2008

(54) SYSTEMS, METHODS AND DEVICES FOR A CALLBACK/CALLBACK REMINDER FEATURE

(75) Inventors: Maleika C. Holder, Jonesboro, GA (US); Vernon Meadows, Lilburn, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/531,194

(22) Filed: Sep. 12, 2006

(65) Prior Publication Data

US 2007/0121874 A1    May 31, 2007

Related U.S. Application Data

(63) Continuation of application No. 10/207,586, filed on Jul. 29, 2002, now Pat. No. 7,145,998.

(51) Int. Cl.
*H04M 1/00* (2006.01)
*H04M 3/42* (2006.01)
*H04Q 7/38* (2006.01)

(52) U.S. Cl. .............. 379/210.01; 455/414.1

(58) Field of Classification Search ........... 379/201.01, 379/201.12, 266.01, 210.01; 455/414.1, 455/445
See application file for complete search history.

(56) References Cited

U.S. PATENT DOCUMENTS

| 4,166,929 A | 9/1979 | Sheinbein |
| 4,582,954 A | 4/1986 | Eaton et al. |
| 4,959,855 A | 9/1990 | Daudelin |
| 5,155,761 A | 10/1992 | Hammond |
| 5,436,967 A | 7/1995 | Hanson |
| 5,438,568 A | 8/1995 | Weisser, Jr. |
| 5,511,111 A | 4/1996 | Serbetcioglu et al. |
| 5,572,583 A | 11/1996 | Wheeler, Jr. et al. |
| 5,943,409 A | 8/1999 | Malik |
| 5,991,364 A | 11/1999 | McAllister et al. |
| 6,035,031 A | 3/2000 | Silverman |
| 6,064,723 A | 5/2000 | Cohn et al. |
| 6,104,786 A | 8/2000 | Gibilisco et al. |
| 6,178,240 B1 | 1/2001 | Walker et al. |
| 6,212,268 B1 | 4/2001 | Nielsen |
| 6,393,106 B1 * | 5/2002 | Cannon et al. ............ 379/67.1 |
| 6,408,062 B1 | 6/2002 | Cave |
| 6,477,374 B1 | 11/2002 | Shaffer et al. |
| 6,658,106 B1 | 12/2003 | Atkinson et al. |
| 6,704,404 B1 | 3/2004 | Burnett |
| 2002/0128036 A1 * | 9/2002 | Yach et al. ................. 455/552 |
| 2003/0081752 A1 | 5/2003 | Trandal et al. |
| 2004/0066928 A1 | 4/2004 | Leijonhufvud |
| 2004/0218750 A1 | 11/2004 | Atkinson et al. |

* cited by examiner

*Primary Examiner*—Harry S. Hong
(74) *Attorney, Agent, or Firm*—Thomas, Kayden, Horstemeyer & Risley

(57) ABSTRACT

A telecommunications device. The device includes a receiver for receiving an incoming call and a processor in communication with the receiver. The processor has a callback/callback reminder module for automatically calling back a calling party of an incoming call or for sending a user a reminder to callback the calling party.

37 Claims, 10 Drawing Sheets

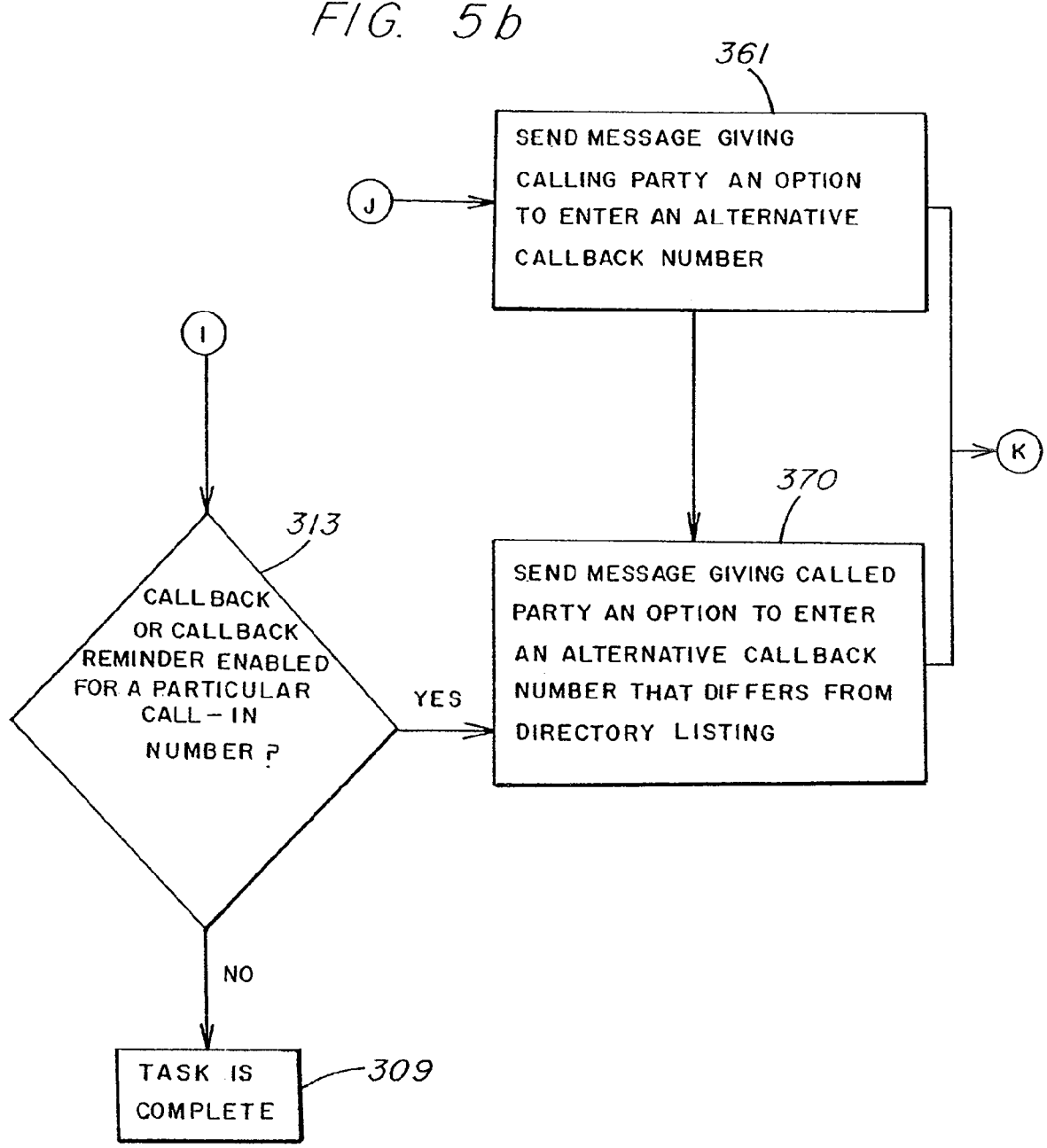

SYSTEMS, METHODS AND DEVICES FOR A CALLBACK/CALLBACK REMINDER FEATURE

CROSS-REFERENCE TO RELATED APPLICATION

This application is a continuation of U.S. utility application entitled, "Systems, Methods and Devices for a Callback/Callback Reminder Feature," having Ser. No. 10/207,586, filed Jul. 29, 2002, which is entirely incorporated herein by reference.

BACKGROUND

Telephones and other telecommunications devices have become pervasive in modem society. When a call is placed to a device, it may not always be convenient for the user of the device to answer the call immediately, even though the user desires to communicate with the calling part. For example, a user of a cellular telephone may receive a call while the user is on-line with another or the user is in a place that it is inconvenient to talk (e.g. in a business meeting or in a public theater). If the user does not answer the call, the user may forget to place a return call to the calling part at a later time if so desired.

SUMMARY

In one embodiment, the present invention is directed to a telecommunications device. The device includes a receiver for receiving an incoming call and a processor in communication with the receiver. The processor has a callback/callback reminder module for calling back the calling part at a later time or for sending the user a reminder to call back the calling party.

In another embodiment, the present invention is directed to a method for one of calling back a calling party of an incoming call to a telecommunications device and sending a reminder to a user to callback the calling party. The method includes detecting the incoming call, detecting whether the user has enabled a function that provides one of a callback to the calling party and a callback reminder to the user for an unanswered call, storing information regarding the incoming call, and one of automatically calling back the calling party and automatically sending the callback reminder to the user.

In another embodiment, the present invention is directed to an apparatus comprising means for detecting an incoming call, means for detecting whether a user has enabled a function that provides one of a callback to a calling party and a callback reminder to the user for an unanswered call, means for storing information regarding the incoming call, and means for one of automatically calling back the calling party and automatically sending the callback reminder to the user.

In another embodiment, the present invention is directed to a telecommunications system. The system includes a server and a services node in communication with a telecommunications device and the server, wherein the services node determines whether a user has enabled a function that provides one of a callback to a calling party and a callback reminder to a user for an unanswered call.

In another embodiment, the present invention is directed to a telecommunications system. The system includes a network server, a gateway, and a services node that is in communication with a telecommunications device, the network server, and the gateway, wherein the services node determines whether a user has enabled a function that provides one of a callback to a calling party and a callback reminder to a user for an unanswered call.

BRIEF DESCRIPTION OF THE DRAWINGS

Further advantages of the present invention may be better understood by refering following description taken in conjunction with the accompanying drawings, in which:

FIGS. 5a, 5b, 5c, 5d, 5e, and 5f are flowcharts illustrating a process performed by a telecommunications device according to one embodiment of the present invention.

DESCRIPTION

Figure 1:
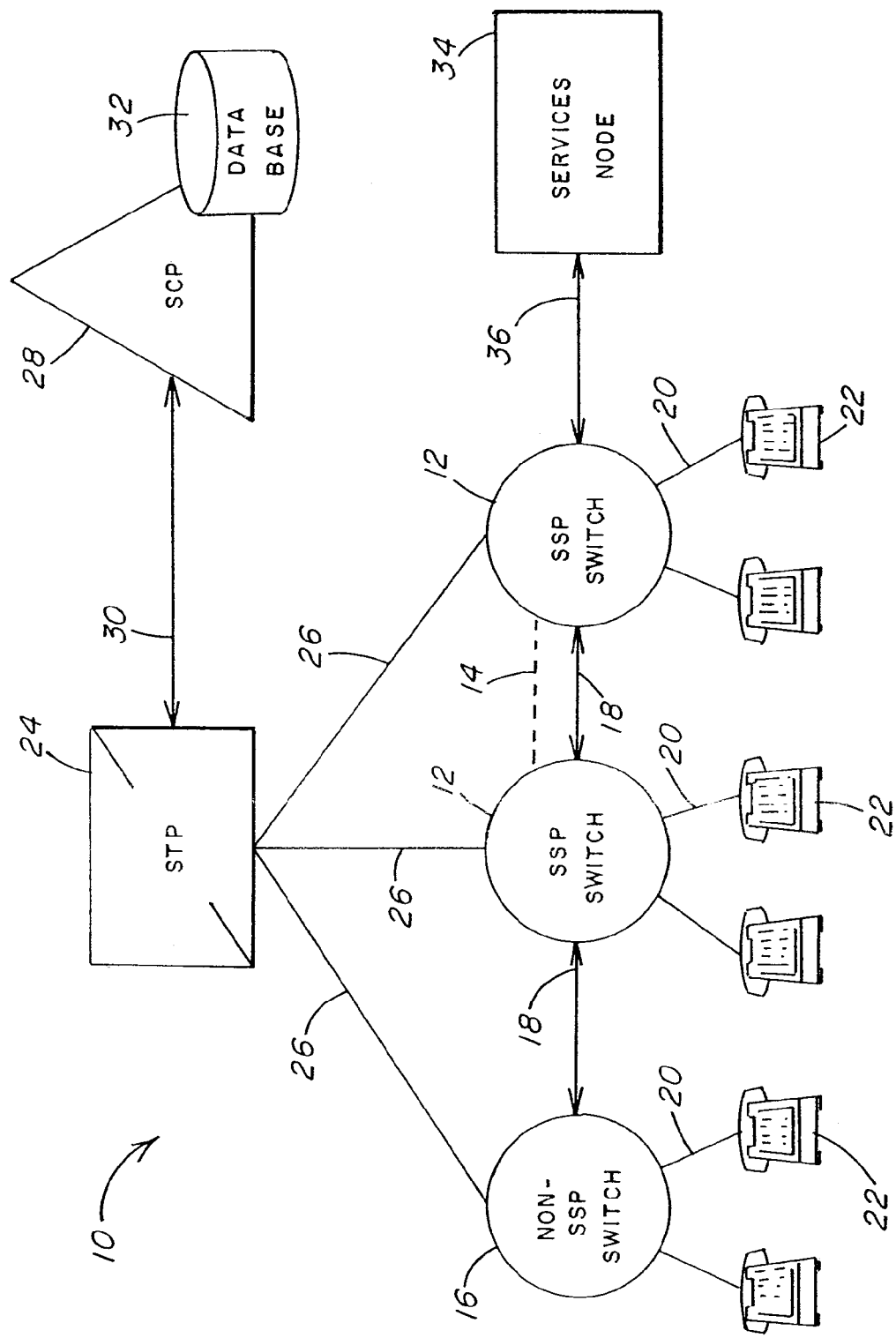
FIG. 1 is a block diagram of an Advanced Intelligent Network (AIN) for integration with a public switched telephone network according to one embodiment of the present invention.

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." In some cases, the calling party may not be a person, but may be a device such as a facsimile machine, an answering service, a modem, etc. The terms "called party" and "user" are used herein generally to refer to the person or unit that answers or responds to the call or communication. The term "communication" is used herein to include all messages or calls that may be exchanged between a calling party and a called party, including, but not limited to, voice, data and video messages. The term "communication" is used synonymously herein with the term "call" unless a distinction is noted. The term "subscriber" is used herein to generally refer to a subscriber of the described telecommunications service.

The present invention allows a user (i.e. a called party) of a telecommunications device to identify (i.e. flag) an incoming call for an automatic callback or a callback reminder. The call may be flagged for an automatic callback or a callback reminder by the user pressing a key or button on the device or the call may be flagged for an automatic callback or a callback reminder according to a pre-defined user set-up. The callback/callback reminder function of the present invention may be performed partially or wholly by the device itself or partially or wholly by telecommunications network to which the device is in communication therewith.

According to one embodiment, the system of the present invention utilizes the intelligent functionality of an Advanced Intelligent Network (AIN). The AIN is a network that may be used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. In another embodiment, the AIN may be a service independent architecture designed to be programmable and controlled by software distributed in elements throughout the network. In addition, the AIN may reside in a Common Channel Signaling (CCS) network, using Signaling System 7 (SS7) protocol to request routing instruction. Before describing details of the system of the present invention, a description of the AIN is provided.

FIG. 1 is a block diagram of an Advanced Intelligent Network (AIN) 10 for integration with the public switched telephone network (PSTN) according to one embodiment of the present invention. The AIN 10 may be employed by a Local Exchange Carrier (LEC), and may be utilized by the LEC to allow the LEC to provide call processing features and services that are not embedded within conventional switching circuits of the PSTN.

A typical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. The number of subscriber lines 20 connected to each switch 12 and switch 16 may be on the order of, for example, ten thousand to one hundred thousand lines. Each of the subscriber lines 20 is connected to a terminating piece of customer premises equipment, represented in FIG. 1 by the landline telephones 22. Alternatively, the terminating equipment may be other types of telecommunications units such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link 26. The communication link 26 may employ, for example, the SS7 switching protocol. The STP 24 may be a multi-port high speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services.

The AIN 10 illustrated in FIG. 1 also includes a services node (SN) 34. The SN 34 may be, for example, a Compact Services Node (CSN) available from Lucent Technologies Inc., Murray Hill, N.J., although the SN 34 may be any other type of available intelligent peripheral. The SN 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the SN 34, the return message from the SCP 28 may include instructions for the SSP switch 12 to route the call to the SN 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one SN 34, although the AIN 10 may further include an additional number of these components as well as other network components which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
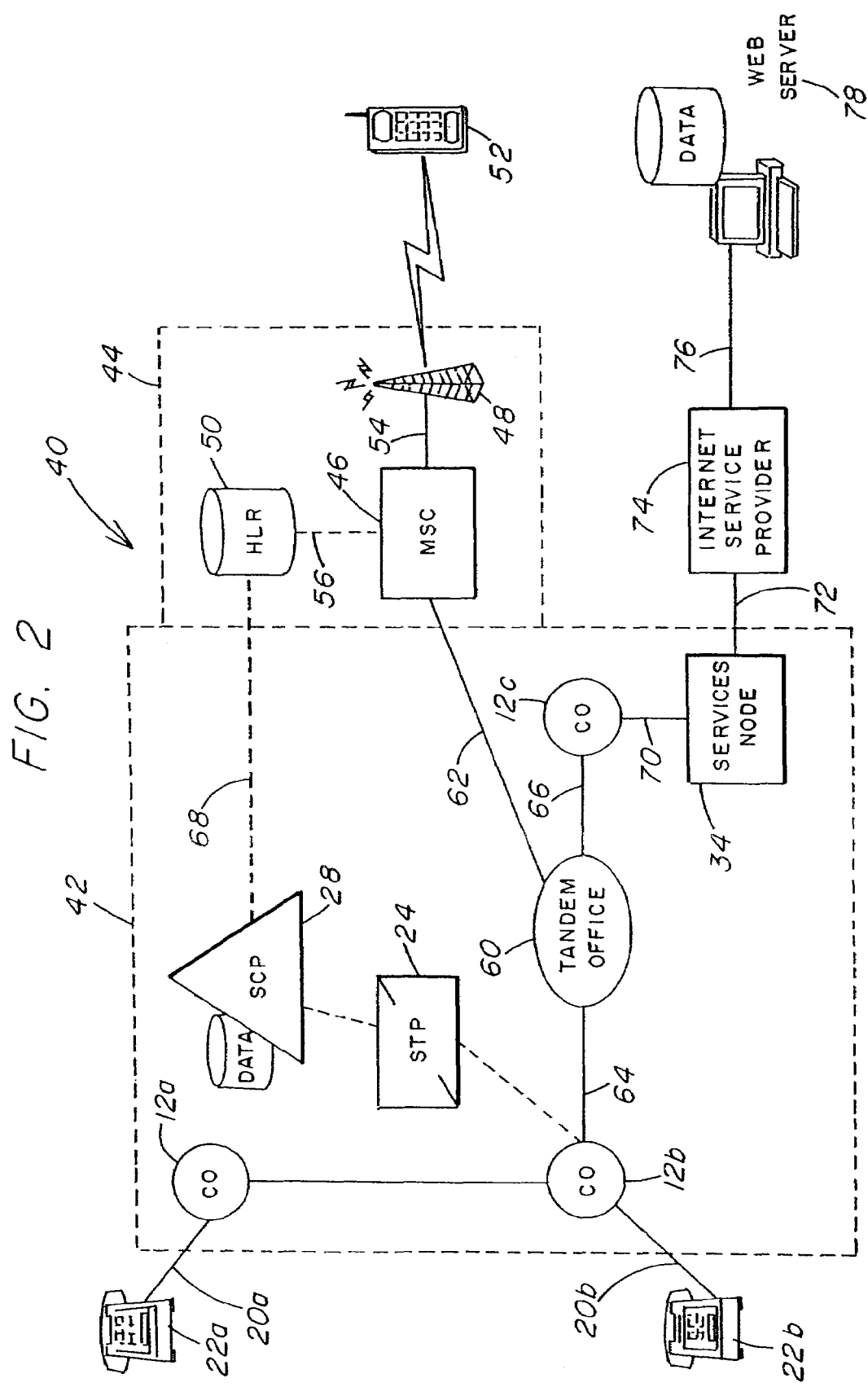
FIG. 2 is a block diagram of a system according to one embodiment of the present invention.

The present invention is directed, according to one embodiment, to a system for allowing a telecommunications device user to identify (i.e. flag) an incoming call for an automatic callback or a callback reminder. FIG. 2 is a diagram of a system 40 according to one such embodiment. The system 40 includes a landline network 42 and a wireless network 44. The landline network 42 includes portions of an AIN as described in conjunction with FIG. 1, including the CO SSP switches 12*a-c* (designated as "CO" in FIG. 2 and referred to as "CO switch(es)" hereinafter), the STP 24, the SCP 28, and the SN 34. The landline telephones 22*a*, 22*b* are in communication with the switches 12*a*, 12*b* via subscriber lines 20*a*, 20*b*, respectively. For purposes of clarity, other elements of an AIN are not shown in FIG. 2.

The wireless network 44 includes a mobile switching center (MSC) 46, a base transceiver station (BTS) 48, and a home location register (HLR) 50. The MSC 46 is in communication with a wireless telecommunications device 52, such as a wireless telephone, as illustrated in FIG. 2, via the BTS 48. The BTS 48 may communicate with wireless telecommunications device 52 according to an air-interface communication scheme such as, for example, AMPS (ANSI-553), TDMA (IS-136), CDMA (IS-95), or GSM. The BTS 48 may be in communication with the MSC 46 via the communications link 54. The MSC 46 is an automatic switching system in a wireless telecommunications network that acts as the interface for subscriber traffic between the wireless network 44 and the landline network 42 or other MSCs in the same or other wireless networks. The MSC 46 performs the same general function as a central office switch in a landline based system. In addition, the MSC 46 supports incoming calls through a radio telecommunications front-end, as well as handoff and roaming functions. Accordingly, the MSC 46 may include wireless IN functionality for detecting originating and terminating triggers (e.g. WIN and CAMEL).

The MSC 46 may be in communication with the HLR 50 via a communications link 56 which may, for example, be an SS7 signaling protocol link. The HLR 50 is a location register to which the user identity of a wireless telecommunications unit, such as the wireless telephone 52, is assigned for record purposes. The HLR 50 may register subscriber information relating to wireless telecommunications devices such as, for example, profile information, current location, and authorization period. When the MSC 46 detects a wireless telecommunications unit entering the MSC's service area, the MSC 46 performs a registration process that includes requesting subscriber profile information from either the HLR 50 or a visitor location register (VLR) (not shown), depending upon whether the wireless telephone 52 is within its home location or within a visitor location. For integrated wireless networks, the VLR assigned to the service area of a visiting wireless subscriber may be updated with information from the HLR associated with the wireless subscriber's wireless service provider (WSP). Accordingly, the MSC 46 servicing a particular area has access to information regarding each of the wireless users presently in its service area. In addition, the HLR 50 of the wireless network 44 may be in communication with the SCP 28 of the landline network 42, via a communications link 68 employing, for example, the IS-41 signaling protocol.

The landline network 42 additionally includes a tandem office 60, which provides a switching interface between the landline network 42 and the wireless network 44. The tandem office 60 may be in communication with the MSC 46 via a communications link 62, which may be, for example, a trunk circuit or an ISDN. In addition, the tandem office 54 may be in communication with the CO switches (such as CO switches 12*b,c* as illustrated in FIG. 2) via communications links 64, 66 respectively, which may be, for example, trunk circuits.

Also, the CO switches (such as the CO switch 12*c*, as illustrated in FIG. 2) may be in communication with a services node (SN) 34 via a communications link 70, which may be, for example, an Integrated Service Digital Network (ISDN), including BRI (Basic Rate Interface) or PRI (Primary Rate Interface) lines. According to other embodiments, the communications link 70 may be, for example, a T-1 trunk circuit.

In one embodiment of the present invention, the SN 34 executes programmable applications to access a Web server database 78 to provide the wireless device 52 with call specific information. The SN 34 then transmits such information to the wireless network 44, via tandem office 60 and MSC 46. In one embodiment of the present invention, the SN 34 may function as a voice/web gateway to allow the landline network to access an Internet service provider 74 via a communications link 72, which may be, for example, a TCP/IP (Transmission Control Protocol/Internet Protocol) connection. Also, the Internet service provider 74 may be in communication with a Web server 78, and its corresponding database, via a communications link 76, which may be, for example, another TCP/IP connection. Furthermore, in one embodiment the SN 34 may be located in the wireless network 44.

In operation, the user of the landline device 22 or the wireless device 52 may enable the callback/callback reminder function by instructing the SN 34 to identify (i.e. flag) all incoming calls for an automatic callback or a callback reminder if the user does not answer the incoming call. The user may enable the callback/callback reminder function by, for example, using DTMF codes (e.g. dialing a star (*) code), telephoning an integrated voice response system (IVRS) and enabling the function and defining its parameters, via a computer web interface, or by communicating the times for the callback/callback reminder function to be active by interfacing with a scheduling program such as, for example, Microsoft Outlook®. The callback/callback reminder function and the handling of the call can be thus directed by the SN 34 (i.e. the process of FIG. 5 is performed using AIN functionality rather than functionality of the device). In such a case, the callback/callback reminder function may be provided as a subscriber service by a telecommunications provider.

In one embodiment, where the callback/callback reminder function is provided as a subscriber service by a telecommunications provider, the SN 34 may execute programmable applications to access a Web server database 78 to provide the wireless network 44 or the landline network 42 with call specific information such as, for example, the number of the calling party and the time and date of the call. In such case, when the callback feature is enabled, the SN 34 may initiate a call to the original calling party and ring back the landline device 22 or the wireless device 52 with a text message. An example of such a message could be, "Callback to (calling party number and name)." Alternatively, if the user enables the callback reminder feature, the SN 34 may ring back the landline device 22 or the wireless device 52 with another text message. An example of such a message could be, "Reminder to call (calling party number and name) (Time and date of original call)."

For clarity in FIG. 2, communications links that are used exclusively for signaling (e.g., no call data) are illustrated with dashed lines, and communications links that transfer signaling and/or call data are illustrated with solid lines.

Figure 3:
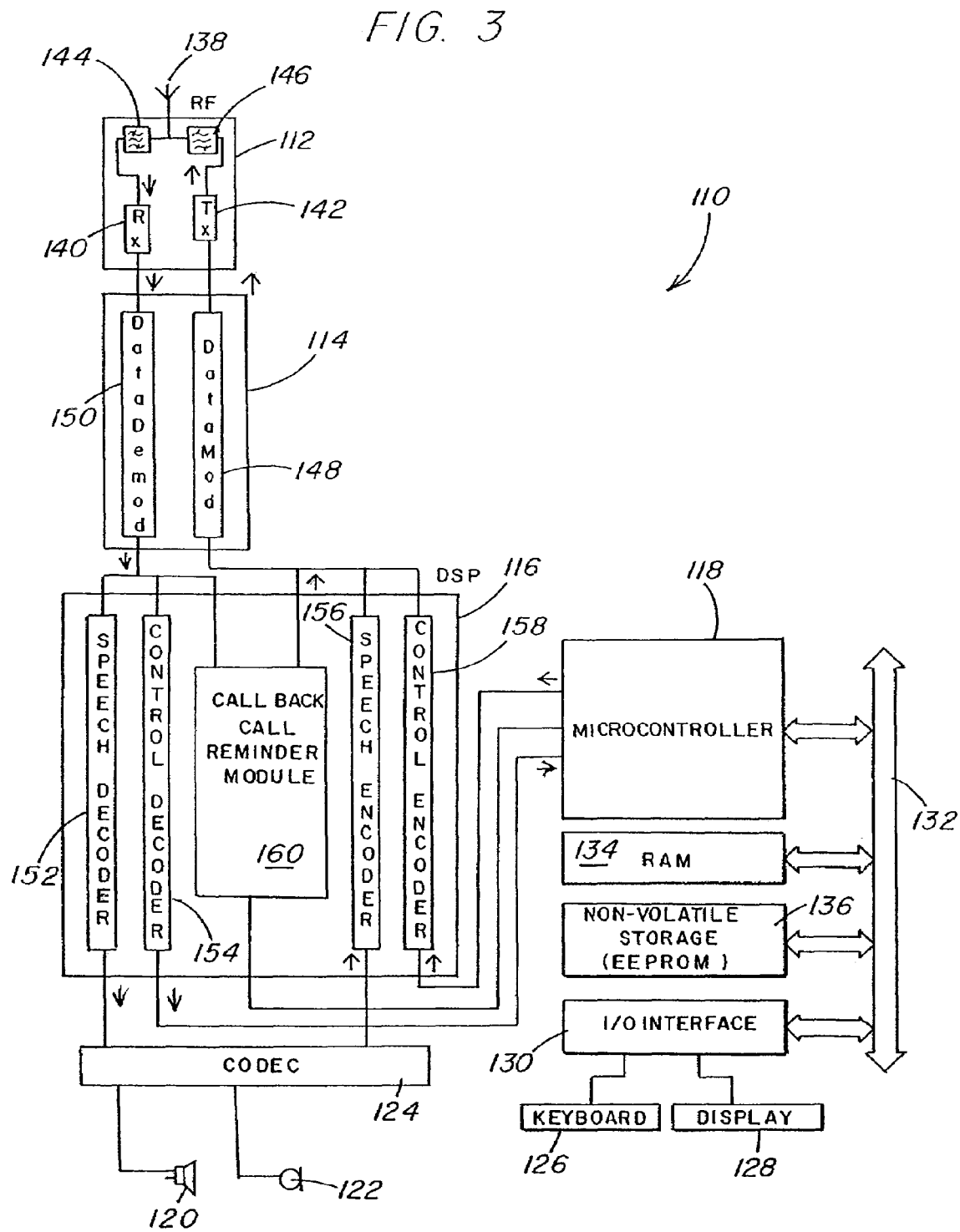
FIG. 3 is a block diagram of a telecommunications device according to one embodiment of the present invention.

FIG. 3 is a block diagram of a telecommunications device 110 according to one embodiment of the present invention. The telecommunications device 110 may be, for example, a digital wireless telephone (DWT) such as the telephone 52 that can function in a digital wireless communication system (e.g., a TDMA system or a CDMA system).

The DWT 110 illustrated in FIG. 3 includes an RF transceiver unit 112, a modulator-demodulator unit 114, a digital signal processor (DSP) 116, and a microcontroller 118. The DWT 110 also includes a speaker 120 and a microphone 122 connected to the DSP 116 via a CODEC (coder-decoder) unit 124. In addition, the DWT 110 includes a keyboard 126 and a display unit 128. The keyboard 126 and the display unit 128 may interface with the microcontroller 118 via an I/O interface 130. The I/O interface 130 may communicate with the microcontroller 118 via a bi-directional bus 132. The DWT 110 may also include memory units such as, for example, a RAM unit 134 and a non-volatile memory unit 136. The memory units 134, 136 may be in communication with the microcontroller 118 via the bi-directional data bus 132. The non-volatile memory unit 136 may be, for example, an EEPROM. According to other embodiments, the DWT 110 may include other types of memory units such as, for example, ROM or flash memory.

The RF transceiver unit 112 may include an RF antenna 138, an R receiver amplifier 140, and an RF transmitter amplifier 142. The RF transceiver unit 112 may also include a pair of band pass filters, a receiver filter 144 and a transmitter filter 146, to filter out signals outside of the receive and transmit frequency ranges, respectively. The RF transceiver unit 112 may establish a telephone communication over one or more RF channels.

The modulator-demodulator unit 114 may include a data modulator 148 and a data demodulator 150. The data demodulator 150 may demodulate voice and control channel bits received by the RF transceiver unit 112, as described further hereinbelow. The data modulator 148 may modulate voice and control channel bits to be transmitted by the RF transceiver unit 114, as discussed further hereinbelow.

The microcontroller 118 may include a number of logic units or circuit elements (not shown) such as a bus control logic unit and a control information processing unit, as well as one or more temporary storage registers or buffers. Among other things, the microcontroller 118 may interpret keyboard entries entered on the keyboard 126 and received via the I/O interface 130. Further, the microcontroller 118 may control the display of information on the display 128 via the I/O face 130.

The DSP 116 may include a number of modules, such as a speech decoder module 152, a control decoder module 154, a speech encoder module 156, a control encoder module 158, and a callback/callback reminder module 160. The modules 152, 154, 156, 158, 160 may be implemented using any type of computer instruction type, such as microcode, and may be stored in, for example, one of the memory units 134, 136, or can be configured into the logic of the DSP 116.

The decoder units, i.e., the speech decoder module 152 and the control decoder module 154, may receive demodulated bit streams from the data demodulator 150. The speech decoder module 152 may supply its output to the CODEC unit 124, and the control decoder module 154 may supply its output to the microcontroller 118 for further processing. The encoder units, i.e., the speech encoder module 156 and the control encoder module 158 may supply their respective outputs to the data modulator unit 148. The speech encoder module 156 may receive encoded speech from the CODEC unit 124, and the control encoder unit 158 may receive transmit control information from the microcontroller 118.

The operation of the callback/callback reminder module 160 is described in more detail hereinbelow in connection with FIG. 5.

The DWT 110 enters into a conversation mode when a voice channel is assigned to it by a base station 48 of the wireless network 44. The analog speech signal from the microphone 112 is first converted into a digital format, e.g., a PCM (pulse code modulation) format, by the CODEC unit 124. The speech encoder module 156 of the DSP 116 may then divide the digital output from the CODEC unit 124 into appropriate time slots and then encode each group of bits. The encoding by the speech encoder 156 may also compress the size of each group of data bits. The DSP 116 may encode via the control encoder 158 any control channel information (including any DTMF audio signaling tones to be transmitted over the digital voice channel) received from the microcontroller 118, and add the encoded control bits to the appropriate group of encoded data bits from the speech encoder 156. The DSP 110 (for example, through the speech encoder module 156) may also add error protection to some of the voice data bits. The combined digital control and voice data bits may then be modulated by the data modulator 148. According to one embodiment, the data modulator 148 is a differential quadrature phase shift keying (DQPSK) modulator. The modulated digital voice and control channel bits may then be transmitted via the RF transceiver unit 112 after amplification by the RF transmitted amplifier 142 and filtering by the transmitter filter 146.

Digital voice and control channel information received by the RF antenna 138 may first be filtered by the receiver filter 144 and amplified by the RF receiver amplifier 140. Thereafter, the data demodulator 150 of the modulator-demodulator unit 114 may demodulate the received voice and control channel bits using, for example, DQPSK demodulation. The DSP 116 receives the demodulated digital voice and control channel bits from the data demodulator 150 and removes the encoding present therein with the speech decoder module 152 and the control decoder module 154 respectively. The decoded control bits may be sent to the microcontroller 118 for further processing. However, the decoded voice bits may be sent to the CODEC unit 124 to reconstruct the analog audio information received through the digital voice bits. The user of the DWT 110 may then listen to the received audio through the speaker 120.

Figure 4:
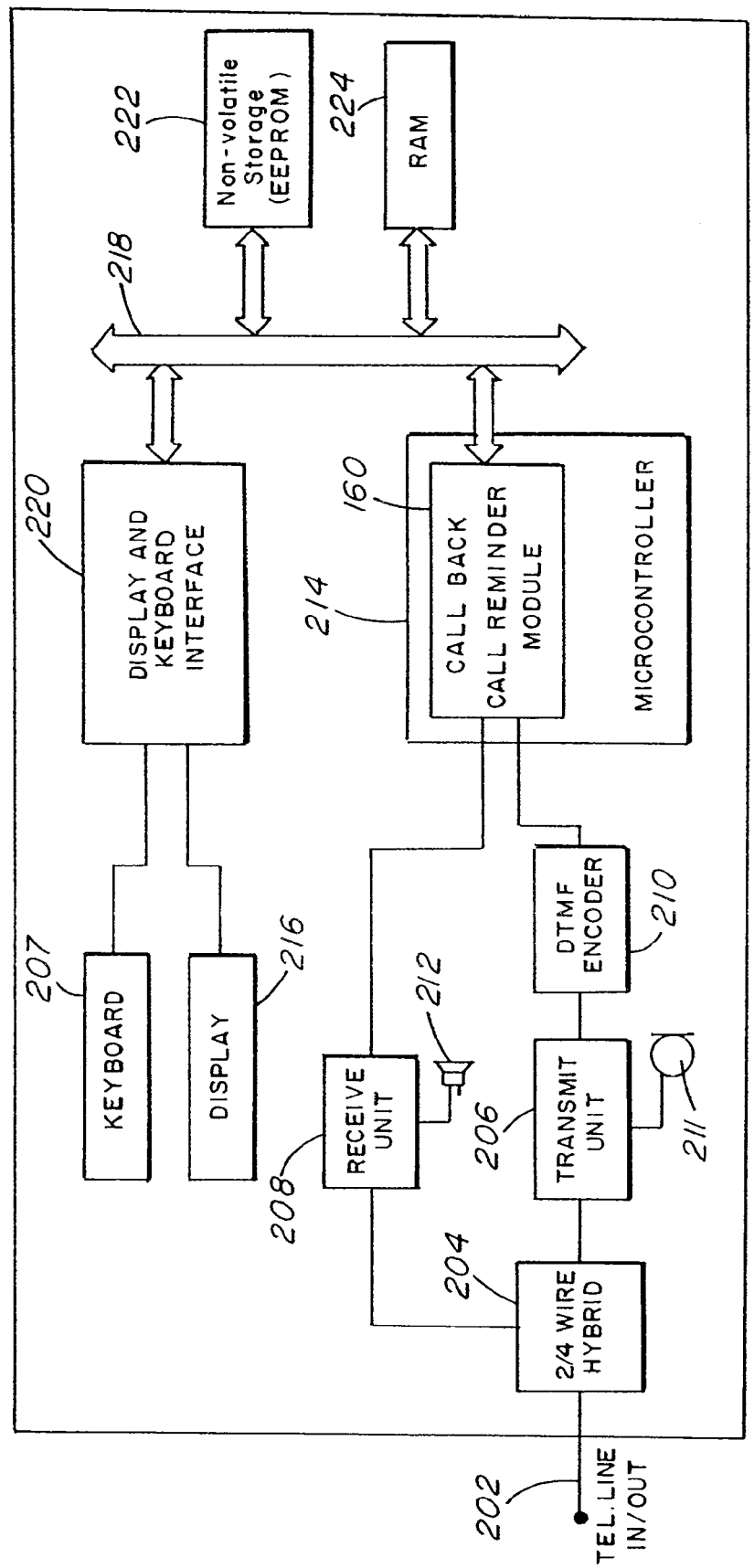
FIG. 4 is a block diagram of a telecommunications device according to another embodiment of the present invention.
Figure 5A:
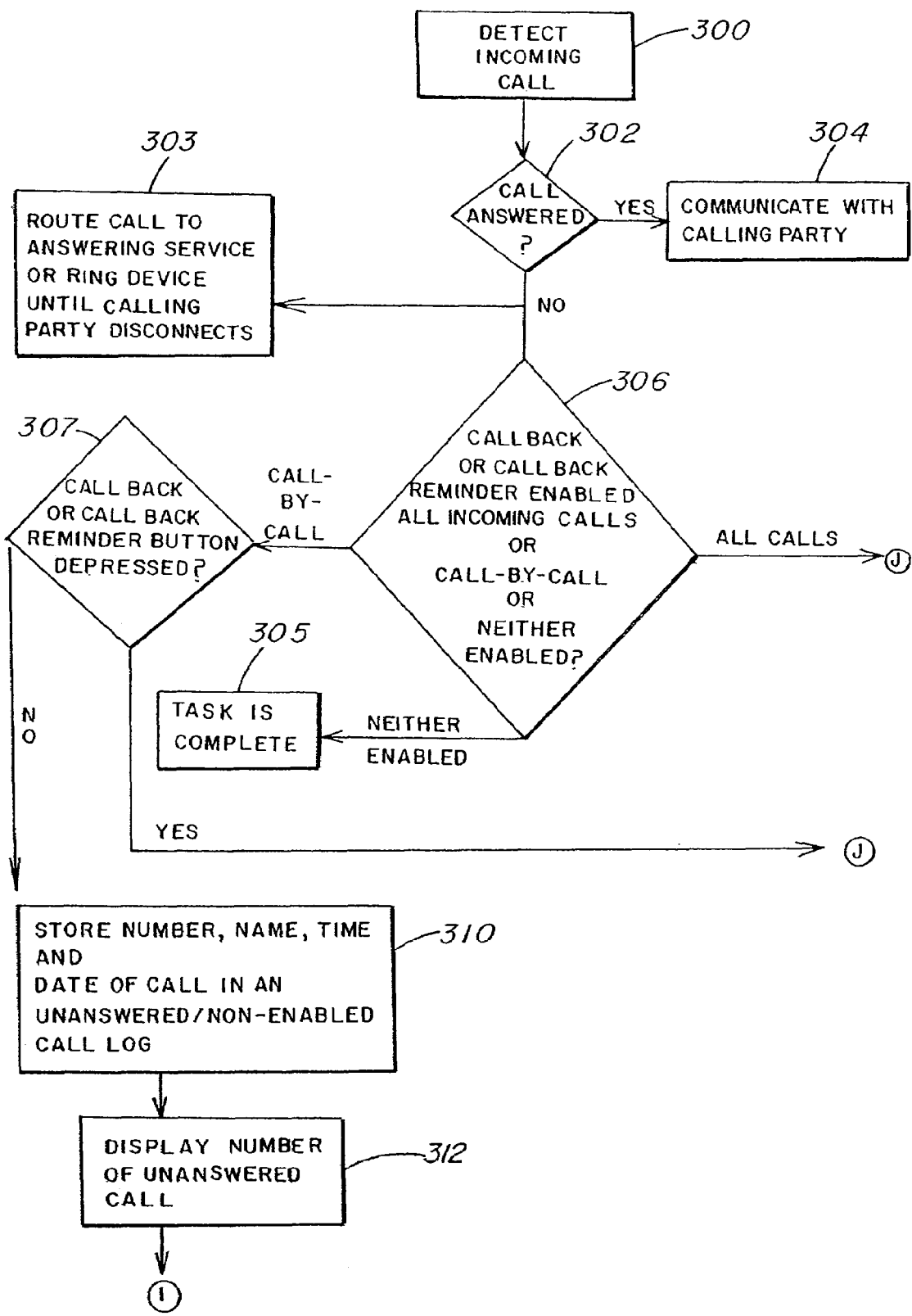
Figure 5C:
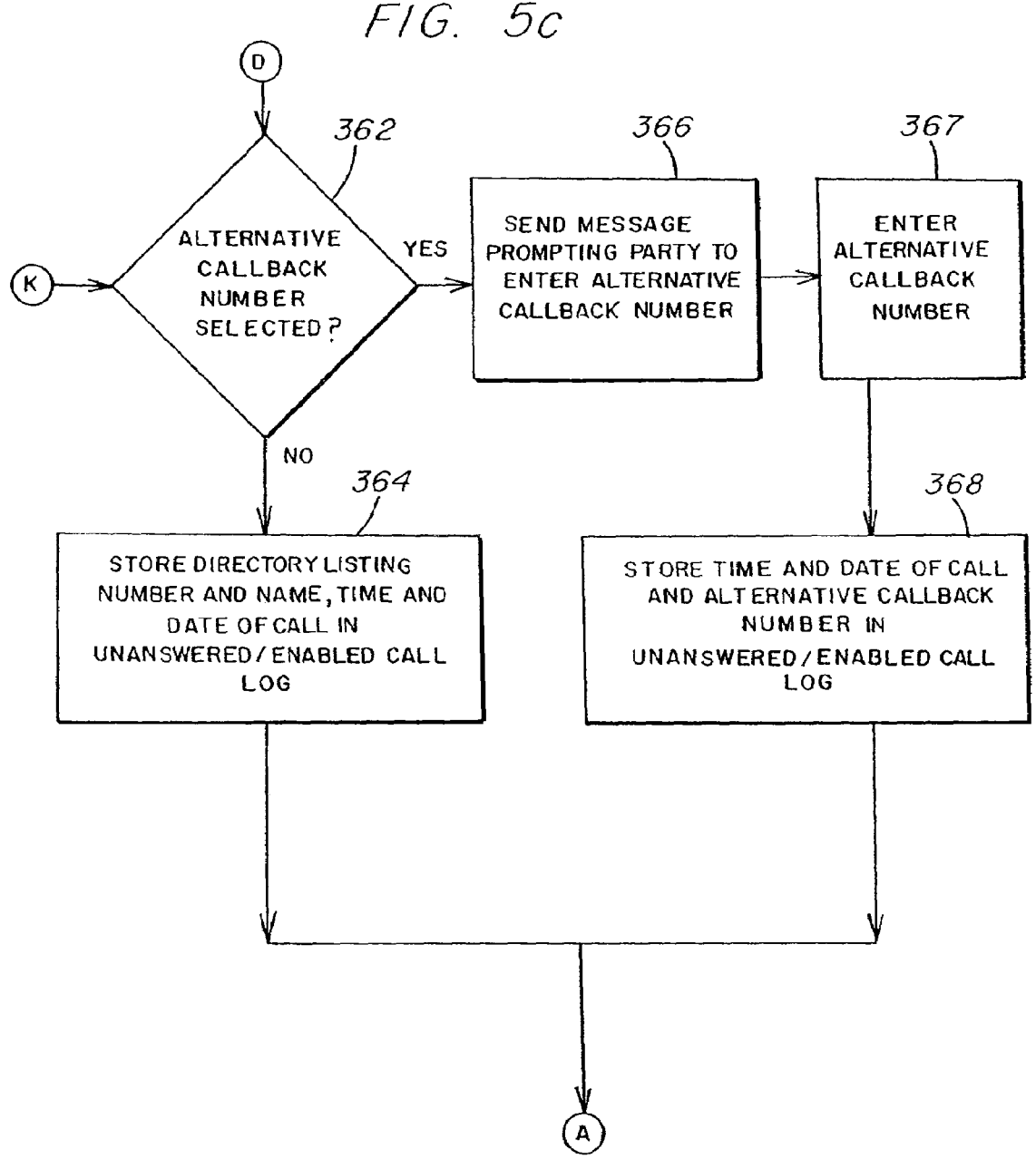
Figure 5D:
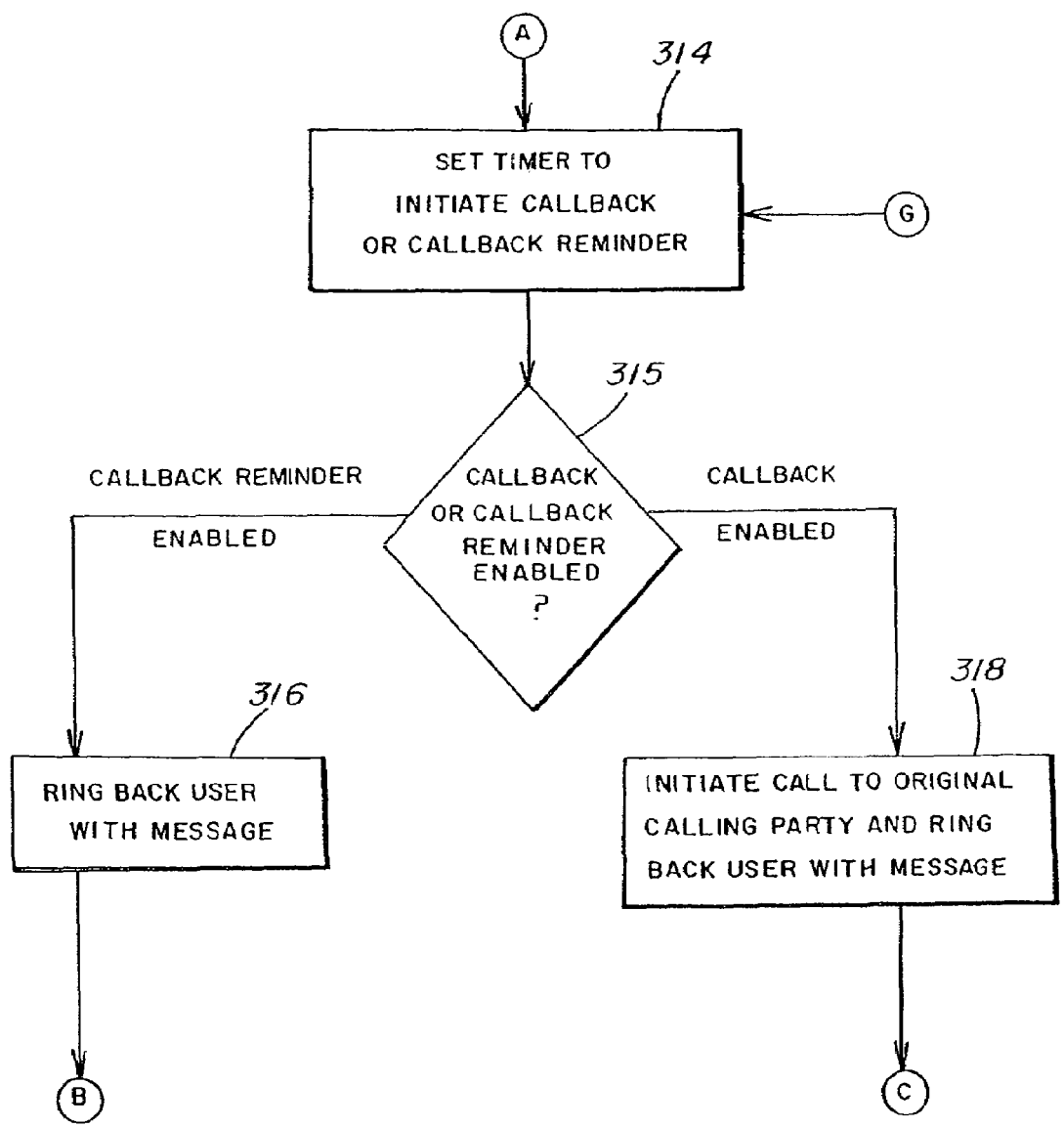
Figure 5E:
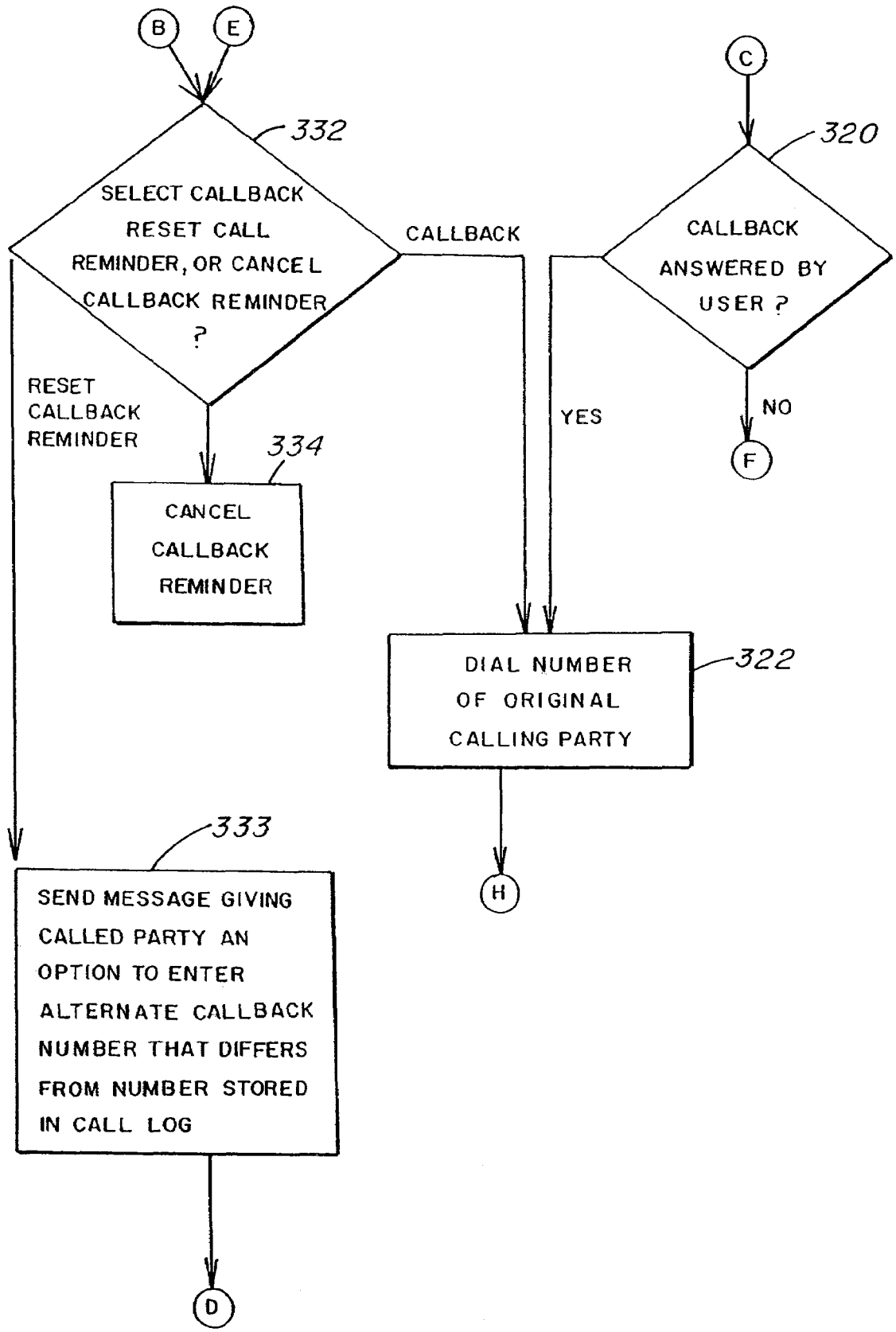
Figure 5F:
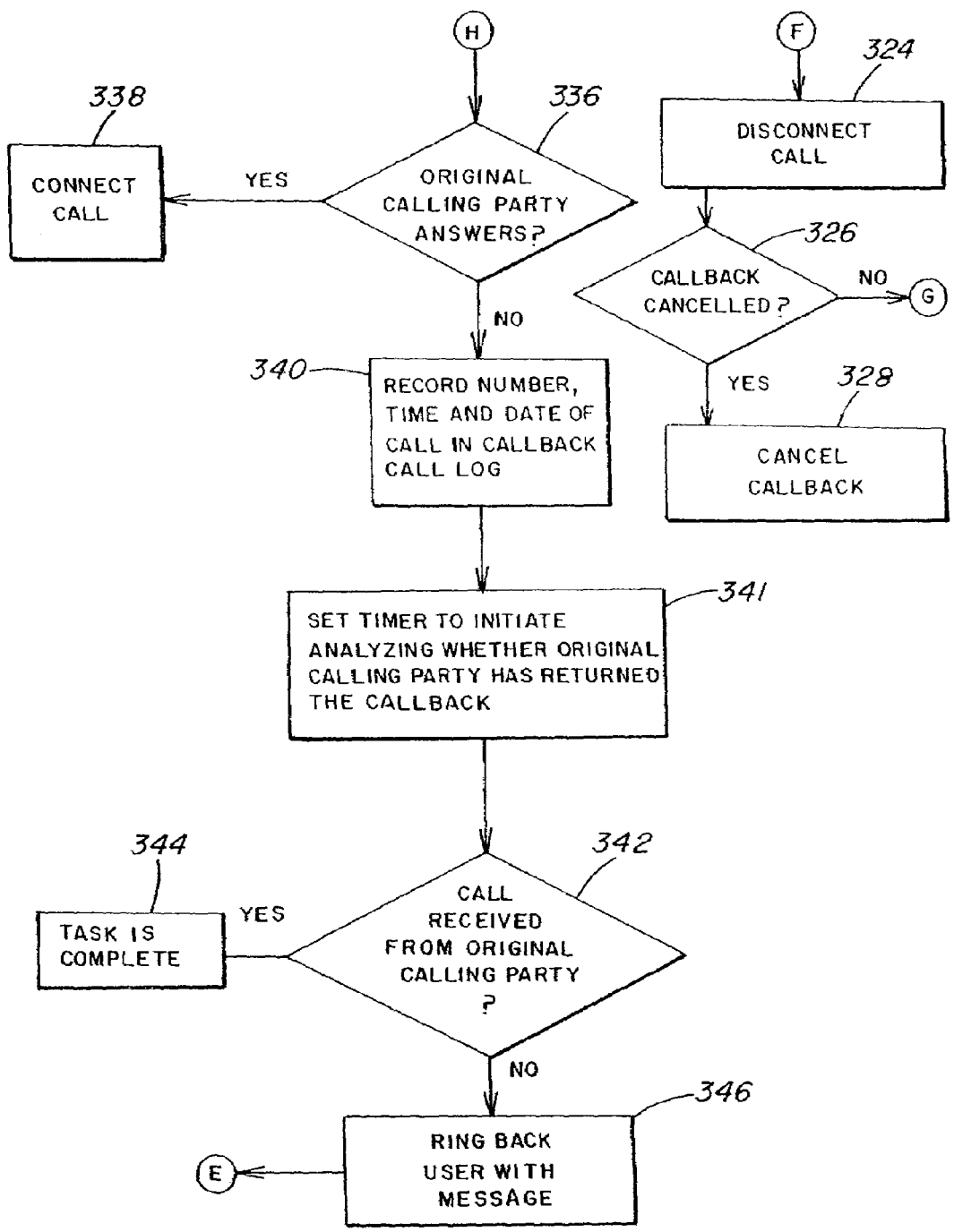

The present invention may also be implemented in a wireline telephone, such as the telephone 22. FIG. 4 is a block diagram of a wireline telephone (WLT) 200 according to one such embodiment. The WLT 200 is connected to a telephone line 202 that, in turn, connects the WLT 200 to a telephone switching office as a part of a subscriber loop. The WLT 200 may include a two-to-four wire hybrid (²⁄₄ wire hybrid) 204 that splits the telephone signals in a two-wire system within the WLT 200 into a four-wire system supported by the telephone switching office.

The WLT 200 may include a transmit unit 206 and a receive unit 208. The transmit unit 206 is connected to the telephone line 202 via the hybrid 204, and may include a pulse/tone dialer (not shown) to transmit digits (and/or symbols) dialed by the user with a keyboard 207. The WLT 200 may also include a DTMF (dual tone multi-frequency) encoder 210 to encode digits (and/or symbols) dialed by the user into corresponding DTMF audio tones before they are sent over the telephone line 202 by the tone dialer of the transmit unit 206. The transmit unit 206 may transmit voice received by a microphone 211 over the outgoing telephone line 202. The receiver unit 208 may also be connected to the telephone line 202 via the hybrid 204. A speaker 212 may be connected to the receive unit 208 to provide the user a means to listen to the conversation.

A display 216 provides a visual interface for the user of the WLT 200. Both the keyboard 207 and the display 216 are in communication with a bi-directional bus 218 via an interface 220. The WLT 200 also includes a non-volatile storage 222 and a volatile storage, such as a RAM 224. According to one embodiment, a microcontroller 214 may include the callback/callback reminder module 160.

FIGS. 5*a*, 5*b*, 5*c*, 5*d*, 5*e*, and 5*f* are flowcharts illustrating an embodiment of a process performed by a telecommunications device, such as the DWT 110 or the WLT 200, according to the present invention. Some or all of the illustrated process can be performed by, for example, the callback/callback reminder module 160. At step 300, the device detects an incoming call. At step 302, it is determined if the user of the device (i.e. the called party) has answered the call. The device may do so by determining whether the device is in an off-hook condition, which may be achieved by the user depressing a button or a key on the device during a specified time or the user picking up the receiver. The period of time may be, for example, the period between the first and second times (e.g. rings) that the device alerts the user of the incoming call. The button or key that the user may press to receive the call may be, for example, a predetermined key on the keyboard of the device or a dedicated receive call button. If the call has been answered by the user, the process continues to step 304 where the device enables the user to communicate directly with the calling party.

If the user has not answered the call, the process continues to step 303 where the incoming call is routed to voicemail or some other answering service that is available or, if no answering service is available, the device will continue to alert the user of the incoming call (e.g. the telecommunications device rings) until the calling party disconnects the call. In addition, the device, at step 306, determines whether the callback or callback reminder function has been globally enabled for all incoming calls, whether the callback or callback reminder function has been enabled on a call-by-call basis, or whether no callback or callback reminder function has been enabled. If the user has neither enabled the callback nor the call reminder function, the task is complete at step 305 and no further action needs to be preformed. Alternatively, the user may predefine a user setup by depressing a key or keys on the keyboard of the device that enables the device either for (1) global callback or callback reminder or (2) call-by-call callback or callback reminder.

If, in step 306, the user has globally enabled the callback or callback reminder function for all incoming calls, the process continues to step 361 where the device may send the calling party a voice and/or text message that gives the calling party an option to enter an alternative callback number. An example of such a message could be, "Your call has been selected for automatic callback. Do you wish to enter a callback number different than (directory listing number)? Select 1 for Yes, Select 2 for No." An alternative callback number may be, for example, a telephone number that differs from the directory listing that is on file in a central office database, which contains profile information concerning the calling party. After providing the calling party an option to enter an alternative callback number, the process continues to step 362 where the device determines if the calling party has selected to enter an alternative callback number. If an alternative callback number has not been selected, the process proceeds to step 364 where the device may store, for example, into an unanswered/enabled call log file: the time and date of the unanswered call, which has been flagged for either automatic callback or callback reminder, the directory number of the originating calling party, and the name that is associated with the number in the directory listing. If an alternative callback number has been selected, the process continues to step 366 where the device may send the party a voice and/or text message prompting the party to enter an alternative callback number. An example of such a message could be, "Please enter the alternative callback number." The process then continues to step 367 where the party enters the alternative callback number. An alternative callback number may be entered, for example, by depressing the numerical keys on the telecommunications device or by the calling party speaking the number. Once the alternative callback number has been entered, the process proceeds to step 368 where the device may store, for example, into an unanswered/enabled call log file: the time and date of the unanswered call, which has been flagged for either automatic callback or callback reminder, and the alternative callback number entered by the party.

If, in step 306, the user has enabled the callback or callback reminder function on a call-by-call basis, the process continues to step 307 where the device determines whether the user has depressed a button or a key on the device during a specified time. The period of time may be, for example, the period between the first and second times (e.g. rings) that the device alerts the user of the incoming call. The button or key that the user may press to enable the callback or callback reminder function may be, for example, a predetermined key or keys on the keyboard of the device or a dedicated callback button or a dedicated callback reminder button.

If a button depression is detected at step 307 within the prescribed time period, the process continues to step 361 where the device may send the calling party a voice and/or text message that gives the calling party an option to enter an alternative callback number. If the predetermined button or key is not depressed (e.g. because the device is turned off or the device was turned on but the user simply did not respond to the call), at step 310 the device may store, for example, into a unanswered/non-enabled call log file: the time and date of the unanswered call, which has been flagged for either automatic callback or callback reminder, the directory number of the originating calling party, and the name that is associated with the number in the directory listing. Once a call is placed in the unanswered/non-enabled call log file, the process continues to step 312 where the device displays the number(s) and name(s) of the unanswered call(s) contained in the unanswered/non-enabled call log. Once the number and name of the unanswered call is displayed, the process continues to step 313 where the device determines if the user selects a particular call-in number and enables the callback or callback reminder function for such number. If the user does not enable the callback or callback reminder function for a particular call-in number, the callback/callback reminder task is complete at step 309 and no further action needs to be performed. If the user has enabled the callback or callback reminder function for a particular call-in number, the process continues to step 370 where the device may send the called party a voice and/or text message that gives the called party an option to enter an alternative callback number. An example of such a message could be, "Do you wish to enter a callback number different than (directory listing number)? Select 1 for Yes, Select 2 for No." The process then continues to step 362 where the device determines if the called party has selected to enter an alternative callback number.

Once automatic callback or callback reminder has been enabled for a particular call-in number and such number, and its corresponding call-in information, are stored in the unanswered/enabled call log file, the device, at step 314, sets a timer to initiate an automatic callback or a callback reminder. At a user specified length of time from receiving the missed call, this timer will trigger the device to determine, at step 315, whether the enabled call-in number has been enabled for callback or callback reminder. For example, if the specified length of time was set for twenty-four (24) hours, the device would either attempt to call back the calling party or send a callback reminder to the user at twenty-four (24) hours past the time of receiving the unanswered call.

If the user enables the callback feature in step 306, 307, or 313, the process continues from step 315 to step 318 where the device initiates a call to the original calling party and rings back the user with a voice and/or text message. An example of such a message could be, "Callback to (calling party number and name)." The device determines, at step 320, if the user answers the callback. If the device receives notification that the user has answered the call back, the process continues to step 322 where the device dials the number of the original calling party. If the device does not receive notification that the user has answered the call back, the process continues to step 324 where the device disconnects the call to the original calling party and the user. Once the call has been disconnected, the device determines if the user has canceled the callback feature for the particular call-in number at step 326. The device may do so by determining whether the user depresses a button or a key on the device during a specified time. The period of time may be, for example, the period between the first and second times (e.g. rings) that the device alerts the user of the callback. The button or key that the user may press to cancel the callback function may be, for example, a predetermined key on the keyboard of the device or a dedicated cancel callback button. If a button depression is detected at step 326 within the prescribed time period, the callback is canceled at step 328. However, if the user does not cancel the callback feature for the particular call-in number, the device, continues to step 314 and resets the timer to initiate a callback at a later time.

If the user enables the callback reminder feature in step 306, 307, or 313, the process continues from step 315 to step 316 where the device rings back the user with a voice and/or text message. An example of such a message could be, "Reminder to call (calling party number and name) (Time and date of original call)." Once a callback reminder has been sent to the user, the device determines, at step 332, if the user selects to (1) call back original calling party, (2) reset the callback reminder, or (3) cancel the callback reminder. The device may do so by determining whether the user depresses a button or a key on the device during a specified time. The period of time may be, for example, the period between the first and second times (e.g. rings) that the device alerts the user of the callback reminder text message. The button or key that the user may press to callback, reset callback reminder, or cancel callback reminder may be, for example, a predetermined key or keys on the keyboard of the device or dedicated callback, reset callback reminder, or cancel callback reminder buttons. If the user selects to cancel the callback reminder feature for a particular call-in number, the device cancels the callback reminder at step 334. If the user selects to call back the original calling party, the process continues to step 322 where the device dials the number of the original calling party. If the user selects to reset the callback reminder to be displayed at a later time, the device continues to step 333 where the device may send the user a voice and/or text message that gives the user an option to enter an alternative callback number. An example of such a message could be, "Do you wish to enter a callback number different than (the number stored in the unanswered enabled call log)? Select 1 for Yes, Select 2 for No." The process then proceeds to step 362 where the device determines if the user has selected to enter an alternative callback number.

Once the number of the original calling party is dialed at step 322, the process proceeds to step 336 where the device determines if the original calling party answers the return call. If the original calling party answers the return call, the device connects the call at step 338. However, if the original calling party does not answer the return call, the device records the number, time, and date of the return call in a callback call log at step 340. The process continues to step 341 where the device sets a timer to initiate analyzing whether the original calling party has returned the callback within a user specified length of time, which is measured from the time of the user placing the return call. At step 342, this timer will trigger the device to determine whether a call was received from the number of the original calling party. If a call was received within a user specified length of time, the callback/callback reminder task is complete at step 344 and no further action needs to be performed. However, if the device did not receive a call from the number of the original calling party within the user specified length of time, the device will ring back the user with a voice and/or text message at step 346. An example of such a message could be, "Callback to (calling party number and name) on (time and date of return call) was unsuccessful." Once ringing back the user with a text message, the process continues to step 332 where the device determines whether the user selects to (1) call back original calling party, (2) reset the callback reminder, or (3) cancel the callback reminder.

According to one embodiment of the invention, the user of the device enables the callback/callback reminder function, at step 306, using a menu that is displayed to the user of the device. The menu may also enable the user, for example, to (1) select the callback, reset, or cancel option at step 332, (2) view and select, on a call-by-call basis, the numbers of unanswered calls for callback or callback reminder at steps 312 and 313, or (3) specify a specified length of time for the device or system to either attempt to call back the calling party or send a callback reminder to the user at step 314.

It can be understood by those skilled in the art that there are many variations of the process illustrated in FIG. 5. For example, the device may include only the functionality to allow the user of the device to callback or callback remind by pressing a button or key only during the time in which the device alerts the user of an incoming call (i.e. the device is ringing). Also, the device may only include functionality to allow the user to callback or callback remind and have no functionality to allow the user to press a button or key to select the callback or callback remind feature. Also, the user may configure the device to not offer the callback/callback remind functionality for all call-in numbers but only for a group of predetermined callers. In yet another example, the user may configure the device to automatically cancel the callback or callback reminder for a particular call-in number after a user defined number of times of attempting to callback the original calling party. Also, the user may configure the device to cancel the callback reminder after a reminder is given to the user a certain number of times (e.g. five times) and the user does not place a call to the calling party after each reminder.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A hand-held telecommunications device, comprising:
   a receiver in the hand-held communications device for receiving an incoming call from a first party to a second party; and
   a processor in communication with said receiver, said processor having a callback module, said callback module configured to automatically call back said first party using a directory listing number associated with the incoming call if the second party has enabled a callback function.

2. The device of claim 1, wherein said device is selected from the group consisting of a wireless telephone and a wireline telephone.

3. The device of claim 1, wherein said receiver includes an RF transceiver unit.

4. The device of claim 1, wherein said processor includes a digital signal processor.

5. The device of claim 1, wherein said processor includes a microcontroller.

6. The device of claim 1, wherein the processor is further configured to send a text message to the second party for notification that an automatic callback is occurring.

7. A method for calling back a first party of an incoming call to a telecommunications device, the method comprising:
   detecting in a hand-held communications device said incoming call;
   detecting in a hand-held communications device whether a second party has enabled a function that provides a callback to said first party for an unanswered call; and
   automatically calling back said first party with a hand-held communications device to connect the first party and the second party.

8. The method of claim 7 further comprising storing information regarding said incoming call in the hand-held communications device.

9. The method of claim 8, wherein said information comprises the number of said incoming call, name of said incoming call, the time of said incoming call, and the date of said incoming call.

10. The method of claim 7, further comprising providing one of said first party and said second party an option to enter an alternative callback number.

11. The method of claim 7, further comprising setting a timer to initiate said callback to said first party.

12. The method of claim 7, further comprising connecting said second party to said first party when the first party answers the call.

13. The method of claim 7, further comprising providing said second party with selection options, said options comprising selecting a callback function, resetting said callback function, and canceling said callback function.

14. The method of claim 7, further comprising alerting said second party of said incoming call.

15. The method of claim 7, further comprising determining whether said second party has pressed a button on said telecommunications device to enable a callback function.

16. The method of claim 7, further comprising determining whether said second party has globally enabled a callback function for all said incoming calls.

17. The method of claim 7, further comprising determining whether said second party has enabled a callback function for a group of predetermined call-in numbers.

18. The method of claim 7, further comprising determining whether said second party has enabled a callback function on a call-by-call basis.

19. The method of claim 7, further comprising determining whether said second party has answered said callback to said first party.

20. The method of claim 7, further comprising determining whether said second party has reset a callback function.

21. The method of claim 7, further comprising determining whether said second party has canceled a callback function.

22. method of claim 7, further comprising determining whether a call was received from the first party within a predetermined time period.

23. The method of claim 7, further comprising sending a text message to the second party for notification that an automatic callback is occurring.

24. An apparatus, comprising:
   means in a hand-held apparatus for detecting an incoming call from a first party;
   means in a hand-held apparatus for detecting whether a second party has enabled a function that provides an automatic callback to a first party for an unanswered call; and
   means in a hand-held apparatus for automatically calling back said first party.

25. The apparatus of claim 24, further comprising means for sending a text message to the second party for notification that an automatic callback is occurring.

26. A telecommunications system, comprising:
   a server; and
   an application module in communication with a hand-held telecommunications device and said server, wherein said application module determines whether a second party has enabled a function on a hand-held communications device that provides an automatic callback to connect a first party and a second party after an unanswered call.

27. The system of claim 26, wherein said application module is configured to function as a gateway to allow a landline network to access an Internet service provider.

28. The system of claim 27, wherein said gateway is configured to function as a voice/web gateway.

29. The system of claim 26, wherein said application module is configured to send one of a voice message and text message to said telecommunications device when a callback function is enabled.

30. The system of claim 26, wherein said application module is configured to call said telecommunications device and the first party when a callback function is enabled.

31. The apparatus of claim 26, further comprising means for sending a text message to the second party for notification that an automatic callback is occurring.

32. A telecommunications system, comprising:
a network server;
a gateway; and
an application module that is in communication with a hand-held telecommunications device, said network server, and said gateway, wherein said application module determines whether a second party has enabled a function on a hand-held communications device that provides an automatic callback to connect a first party to a second party after an unanswered call.

33. The system of claim 32, wherein said application module is configured to send one of a voice message and text message to said telecommunications device when a callback function is enabled.

34. The system of claim 32, wherein said application module is configured to call said telecommunications device and first party when a callback function is enabled.

35. The system of claim 32, wherein said gateway is in communication with an Internet service provider.

36. The system of claim 32, wherein said gateway is configured to function as a voice/web gateway.

37. The system of claim 32, wherein the service node sends a text message to the second party for notification that an automatic callback is occurring.

* * * * *